US008304668B2

(12) United States Patent
Collins et al.

(10) Patent No.: US 8,304,668 B2

(45) Date of Patent: Nov. 6, 2012

(54) SCALE WITH KIOSK ORDERING INTERFACE SYSTEM AND METHOD

(75) Inventors: Harry W. Collins, Troy, OH (US); Debra L. Dyer, Vandalia, OH (US)

(73) Assignee: Premark FEG L.L.C., Glenview, IL (US)

( * ) Notice: Subject to any disclaimer, the term of this patent is extended or adjusted under 35 U.S.C. 154(b) by 365 days.

(21) Appl. No.: 12/690,978

(22) Filed: Jan. 21, 2010

(65) Prior Publication Data

US 2010/0185483 A1 Jul. 22, 2010

Related U.S. Application Data

(60) Provisional application No. 61/146,422, filed on Jan. 22, 2009.

(51) Int. Cl.
*G01G 19/413* (2006.01)
*G06K 15/00* (2006.01)

(52) U.S. Cl. .................... 177/25.13; 235/383; 702/173; 705/414

(58) Field of Classification Search .... 177/25.11–25.19; 702/173–175; 705/414–416; 235/383
See application file for complete search history.

(56) References Cited

U.S. PATENT DOCUMENTS 4,128,757 A 12/1978 Garner, Jr.
4,396,985 A 8/1983 Ohara
4,630,067 A * 12/1986 Teraoka .......................... 347/180
4,693,329 A * 9/1987 Hikita .............................. 177/4
4,700,791 A * 10/1987 Iwasaki et al. .................... 177/2
4,797,818 A 1/1989 Cotter
6,415,555 B1 * 7/2002 Montague ...................... 52/36.2
6,880,750 B2 * 4/2005 Pentel .......................... 235/380
6,884,946 B2 4/2005 Miller et al.
6,959,283 B1 * 10/2005 White ............................ 705/15
6,972,384 B2 * 12/2005 Huitt et al. ................ 177/25.13
6,982,388 B2 1/2006 Kasinoff
7,022,017 B1 4/2006 Halbritter et al.
7,041,915 B2 5/2006 Kasinoff
7,051,944 B2 5/2006 Weisz et al.
7,587,335 B2 9/2009 Schuller et al.
7,597,254 B2 10/2009 Miller et al.
2002/0049736 A1 4/2002 Chow
2003/0046166 A1 3/2003 Liebman
2003/0154131 A1 8/2003 Tsang
2003/0163388 A1 8/2003 Beane
2003/0182209 A1 9/2003 Ge et al.
2004/0054592 A1 3/2004 Hernblad
2005/0040230 A1 * 2/2005 Swartz et al. ................ 235/383
2005/0256774 A1 11/2005 Clothier et al.
2006/0218039 A1 9/2006 Johnson
2006/0218040 A1 9/2006 Sabapathypillai
2006/0219780 A1 * 10/2006 Swartz et al. ................ 235/383
2007/0210155 A1 * 9/2007 Swartz et al. ................ 235/383
2008/0190672 A1 * 8/2008 Miller et al. .............. 177/25.15
2008/0245581 A1 * 10/2008 Tamkin et al. ............ 177/25.15
2008/0313046 A1 12/2008 Denenburg et al.
2010/0000801 A1 * 1/2010 Smith et al. ............... 177/25.15

* cited by examiner

*Primary Examiner* — Randy W Gibson

(74) *Attorney, Agent, or Firm* — Thompson Hine LLP

(57) ABSTRACT

A food product scale is adapted to interface with an electronic product ordering system, such as a kiosk ordering system, enabling store personnel to more readily identify, process and complete such orders.

15 Claims, 12 Drawing Sheets

System | Back | Product | Settings | Help

KIOSK ORDER 766

| PLU | ORDER DETAILS | |
|---|---|---|
| 9325 | 1 LBS CUT VERY THIN | BRAND 'X' SWEET SLICE HAM |
| 9603 | 3/4 LBS CUT VERY THIN | BRAND 'X' PROVOLONE |
| 9003 | 1/2 LBS CUT SHAVED | BRAND 'X' ALL NATURAL TUSCAN TURKEY |

Exit Kiosk Orders 78

Kiosk Orders
December 2, 2006 3:33PM Capacity 30x0.01 lb. 12x0.005 lb

System | Back | Product | Settings | Help

KIOSK ORDER 766

| PLU | ORDER DETAILS | |
|---|---|---|
| 9325 | 1 LBS CUT VERY THIN | BRAND 'X' SWEET SLICE HAM |
| 9603 | 3/4 LBS CUT VERY THIN | BRAND 'X' PROVOLONE |
| 9003 | 1/2 LBS CUT SHAVED | BRAND 'X' ALL NATURAL TUSCAN TURKEY |

Exit Kiosk Orders 78

Kiosk Orders
December 2, 2006 3:33PM Capacity 30x0.01 lb. 12x0.005 lb

System Back Product Settings Help

KIOSK ORDER SUMMARY

| ORDER # | TIME OF ORDER | PICK UP TIME |
| --- | --- | --- |
| 765 | 3:12PM | 3:27PM |
| 766 | 3:15PM | 3:30PM |
| 767 | 3:19PM | 3:34PM |
| 768 | 3:20PM | 3:35PM |
| 769 | 3:21PM | 3:36PM |
| 770 | 3:23PM | 3:38PM |
| 771 | 3:25PM | 3:40PM |
| 772 | 3:27PM | 3:42PM |
| 773 | 3:30PM | 3:45PM |
| 774 | 3:32PM | 3:47PM |

Exit Kiosk Orders

78

Kiosk Orders
December 2, 2008 3:33PM

Capacity 30x0.01 lb, 12x0.005 lb

*Fig. 5*

SCALE WITH KIOSK ORDERING INTERFACE SYSTEM AND METHOD

CROSS-REFERENCES

This application claims the benefit if U.S. Provisional Application Ser. No. 61,146,422, filed Jan. 22, 2009, the entirety of which is incorporated herein by reference.

TECHNICAL FIELD

The present application relates generally to scales used to weigh food products in supermarkets, and more particularly to a scale that facilitates KIOSK type customer ordering operations.

BACKGROUND

Scales have been used in stores such as supermarkets and groceries to weigh and price food items and to generate a pricing label for such food items. A typical store includes multiple scales located in multiple perishables departments. It is important that weighed items be priced properly and therefore scales are commonly connected into a store network. Various types of scale networks exist.

There exists an ever present customer demand to reduce the time it takes for customers to complete the store shopping experience. Accordingly, for the purpose of perishables order, particularly ordering of deli and/or bakery items, systems exist that provide one or more KIOSKs in the store enabling a customer to place an order. The deli or bakery department includes a printer that prints the order so that deli personnel can work the order while the customer proceeds with shopping throughout the rest of the store.

It would be desirable to improve upon KIOSK type ordering systems, and provide a scale adapted for the receipt and processing of KIOSK and other electronically submitted food product orders.

SUMMARY

A food product scale is adapted to interface with an electronic product ordering system, such as a kiosk ordering system, enabling store personnel to more readily identify, process and complete such orders.

In one aspect, a scale for use in weighing food products includes a weighing station for receiving food products to be weighed, the weighing station having an associated mechanism for producing weight indicative signals. A controller is operable to establish a price for a weighed food product based in part upon a weight indicative signal produced for that food product. A communications interface of the scale can receive electronic product orders. An operator interface includes an operator display. The controller is connected with the operator display for control thereof. The controller is configured to receive electronic product orders and provide an operator with interface display information enabling the operator to select, view and process electronic product orders.

In another aspect, a method for filling food item orders in a store involves utilizing a scale including a weighing station, a controller pricing food items based upon weight, a communications interface for receiving electronic product orders, and an operator interface including an operator display; receiving electronic product orders at the scale via the communications interface; enabling operator selection of an electronic order function of the scale; upon operator selection of the electronic order function, displaying a list of electronic orders; enabling operator selection of an electronic order for processing; and upon operator selection of an electronic order for processing, the operator display displaying multiple items contained within the selected electronic order.

BRIEF DESCRIPTION OF THE DRAWINGS

FIGS. 4-13 depict various scale interface screens associated with electronic order processing.

DETAILED DESCRIPTION

Figure 1:
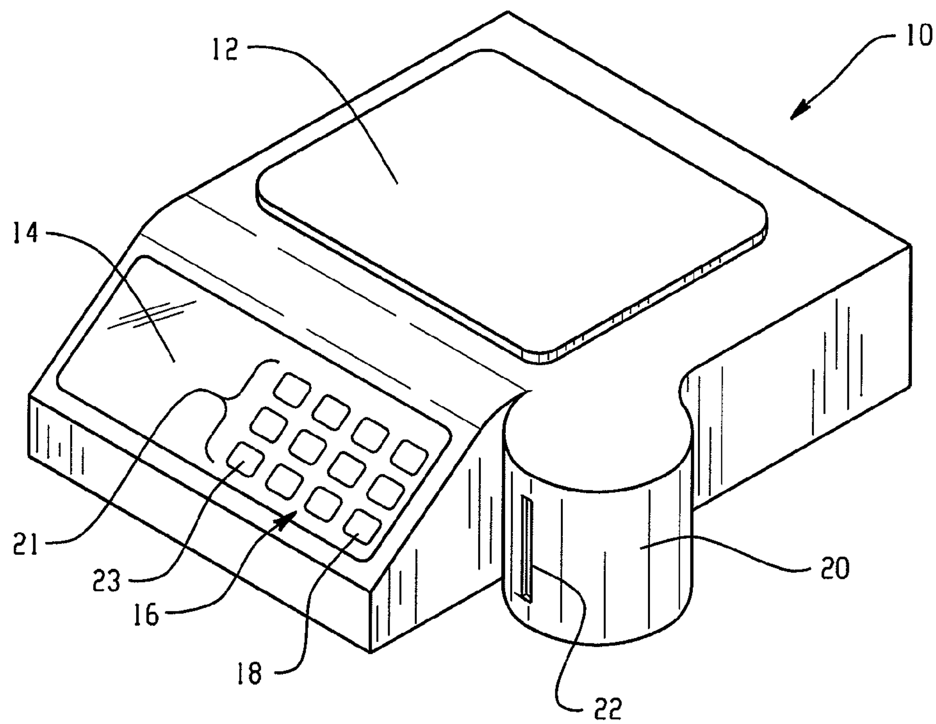
FIG. 1 is a perspective view of an exemplary food product scale.

Referring to FIG. 1 an exemplary scale 10 is shown including a weigh station 12 and a display 14. Weigh station 12 may take the form of a platter-type member supported in relationship to a load cell (internal of the scale housing) that produces a weight indicative signal when a food item is placed on the weigh station 12 for weighing. Illustrated display 14 may take the form of an LCD-type display, but other technologies could be used. In the illustrated embodiment the display 14 is a touch screen-type display that also functions as a user input device 16 by displaying image buttons/icons 18 that can be triggered or selected by an operator. The buttons/icons 18 allow for user selection of an item to be weighed from a menu or group 21 of items 23 presented to the user by display 14. In one variation the group 21 may be a numeric keypad allowing manual entry of product numbers. In another variation the group 21 may be images of specific products that might be weighed by the scale. A separate operator input device could also be provided, for example, in the form of manually activated keys/buttons located alongside the display 14. A side portion 20 of the scale housing holds a label printer and associated supply of labels, which are dispensed through a label slot 22 in the housing. Although display screen 14 is shown incorporated into the housing of the scale 10, the display could take the form of a marquee-type display located on a support extending upward from the scale housing. In some implementations the display need not be attached to the scale/printer via a support but could be a separately housed console that is logically attached to the scale/printer.

Figure 2:
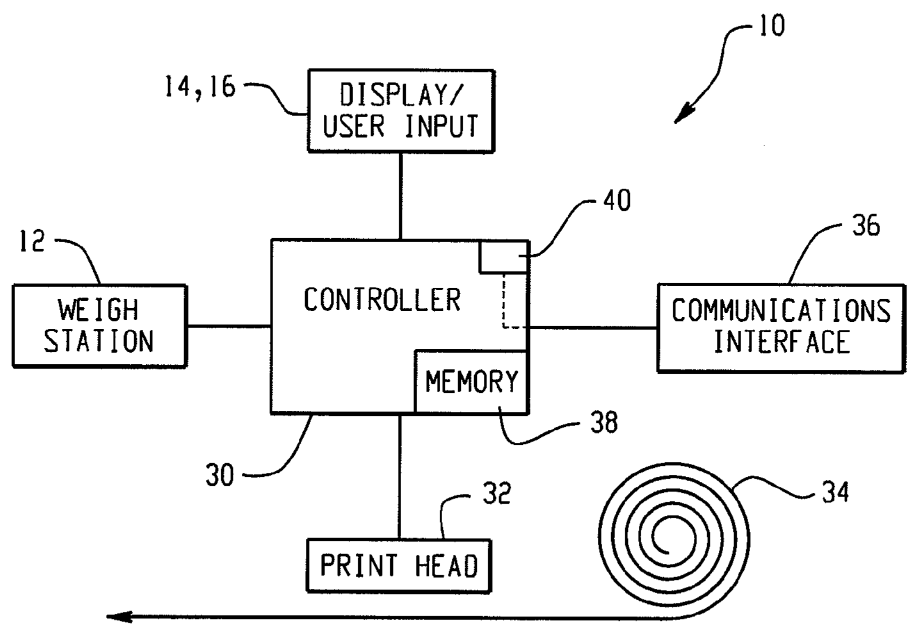
FIG. 2 is a schematic view of the scale of FIG. 1.

Referring now to FIG. 2, an exemplary high level schematic of the scale 10 is shown. The scale includes a controller 30, such as a microprocessor based unit, connected to control the display 14 and user input 16 and connected to receive weight indicative signals from the weighing station 12. A print head 32 and associated supply of label stock 34 that can be moved past the print head 32 is also shown. In one example the print head 32 may be a thermal print head for use with thermally activated label stock. However, other types of printing technologies and label media could also be used. Likewise, RFID read/write technology could be incorporated for dealing with labels having RFID tags. The controller 30 is also connected with a communications interface 36, which may take the form of a standard connector (and associated circuitry) for a USB, RS-232, Ethernet or other hard-wired communication line. In another example the communications interface 36 may be formed by a wireless communication device such as an RF transceiver. Multiple communication interfaces could also be provided. The illustrated controller 30 includes associated memory 38 for storing product information (e.g., product names, characteristics and pricing stored in association with corresponding product numbers), software and firmware.

Operator access to use of the scale may be controlled by requiring an operator to provide operator identification data. For example, an operator may be required to utilize the user input device to enter an employee number. In other embodiments the scale may be equipped with an RF transceiver by which the scale identifies and RFID tag carried by the operator, or the scale may include a card reader and the operator may be required to swipe a card with identifying data embedded thereon.

Figure 3:
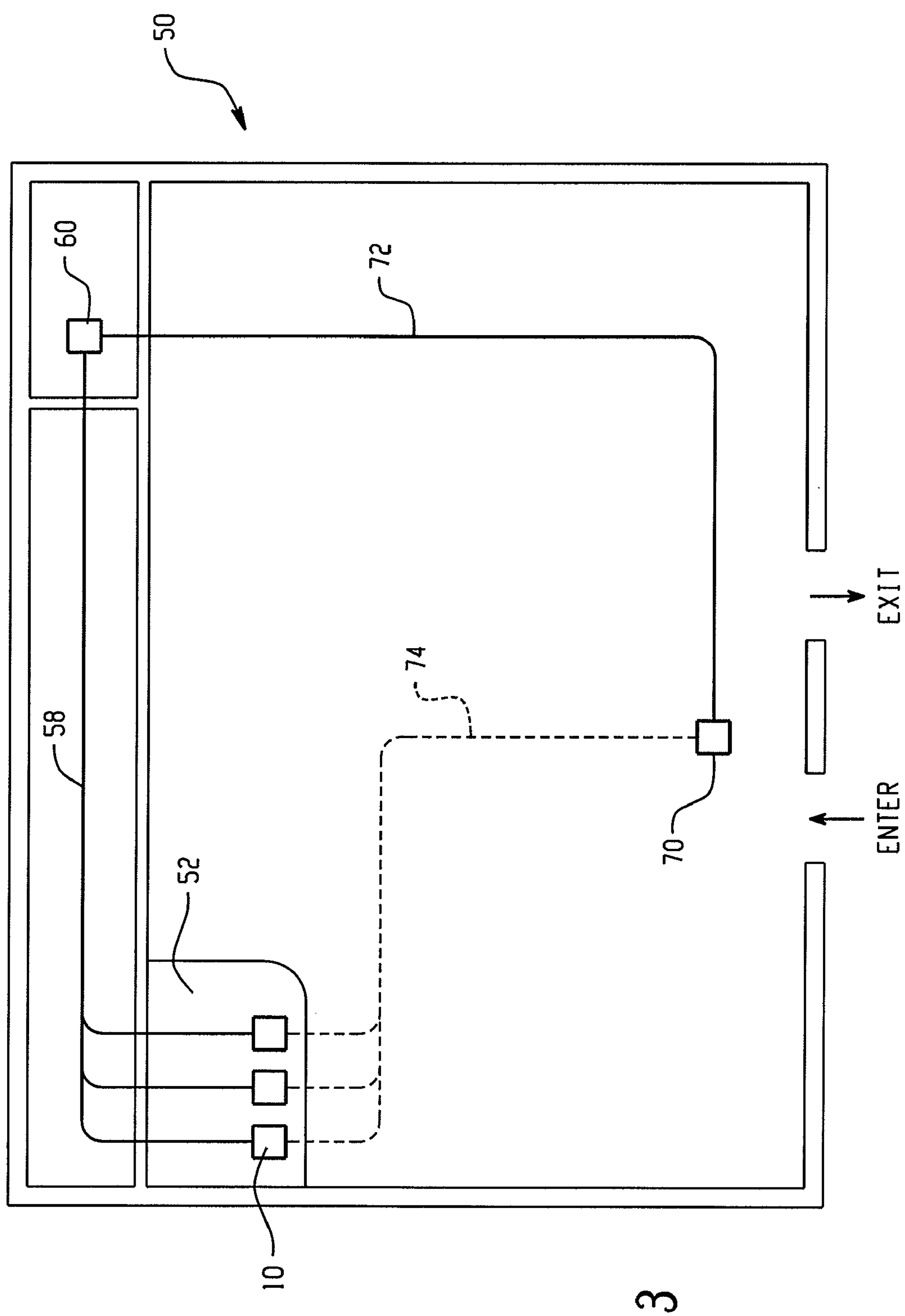
FIG. 3 is a schematic of multiple scales within a store.

Referring also to FIG. 3, an exemplary store layout 50 is shown with multiple scales 10 in a perishables department 52 (e.g., such as the deli department, the meat and fish department, the bakery department and/or the fruit and vegetable departments), each scale connected to a network 58 for communicating with one of the other scales 10 and/or for communicating with a store computer, which may be located in the store as indicated by computer 60 or, alternatively, at a site remote from the store. In a typical store application, each scale receives product information updates (e.g., price changes, data for new product offerings, etc.) via the network connection so that the scales are capable of pricing products accurately. The scales may receive the price information directly from the store computer 60 or may receive price updates from one of the other scales.

A KIOSK ordering unit 70 is shown near the store entrance, but could be located elsewhere within the store. Multiple KIOSK units 70 could also be provided. The KIOSK unit 70 provides a customer interface that enables a customer to place an order for items in the department 52. The KIOSK unit is configured to enable customers to identify multiple food items and related quantities, which are then defined as a single product order (e.g., with an order identifying number). The unit 70 is connected by link 72 for communication with the store computer 60. In turn, the store computer 60 sends the order information directly to the scales 10. Alternatively, the KIOSK unit 70 could be connected for sending the order information directly to the scales as suggested by dashed line communications link 74.

Figure 4:
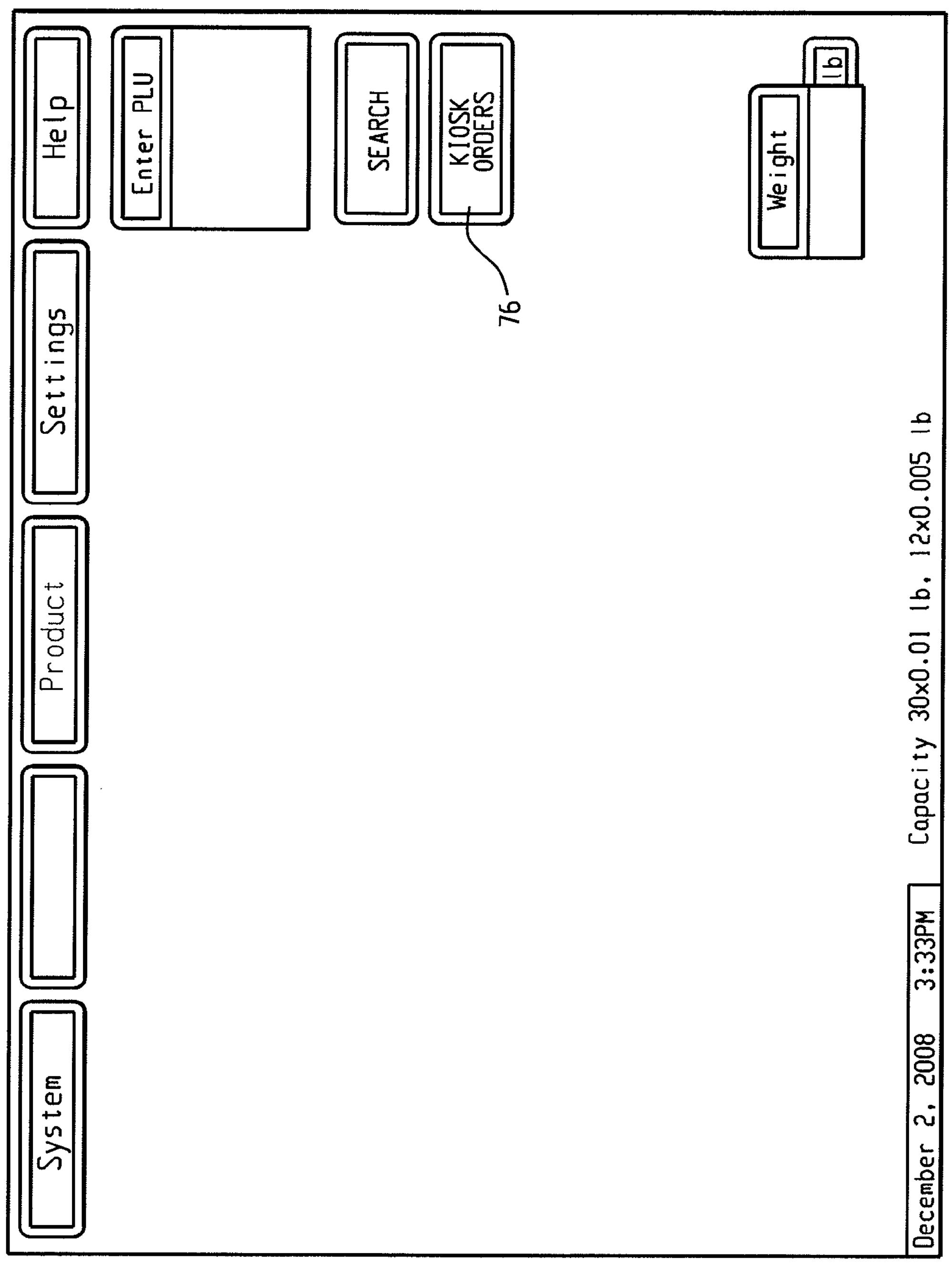

Referring to FIG. 4, the scale interface includes a selectable button 76 relating to KIOSK orders. Selection of button 76 brings up a KIOSK Order Summary screen such as that shown in FIG. 5. The scale operator can exit the KIOSK order mode at any time by selecting the exit button 78. Orders displayed on the summary screen are generally listed in the order received, and the order #, time of the order and proposed pick up time may be displayed. Orders may also be color-coded, or otherwise contrasted to each other (e.g., different fonts, highlighting or relative positioning), to provide an indication of the order status. By way of example, orders that are already in process by another scale operator may be shown in one color, in which case the scale may disable the ability of the specific operator that is logged into the scale to select such an order, thereby avoiding duplicative filling of the same order by different operators. Orders that have been pending for more than a certain time period (e.g., 15 minutes) or that are beyond the proposed pickup time may be shown in another color to alert operators to the fact that the orders need to be processed quickly. Orders currently in process by the specific operator that is logged into the scale, but not completed, may be shown in another color.

Figure 6:
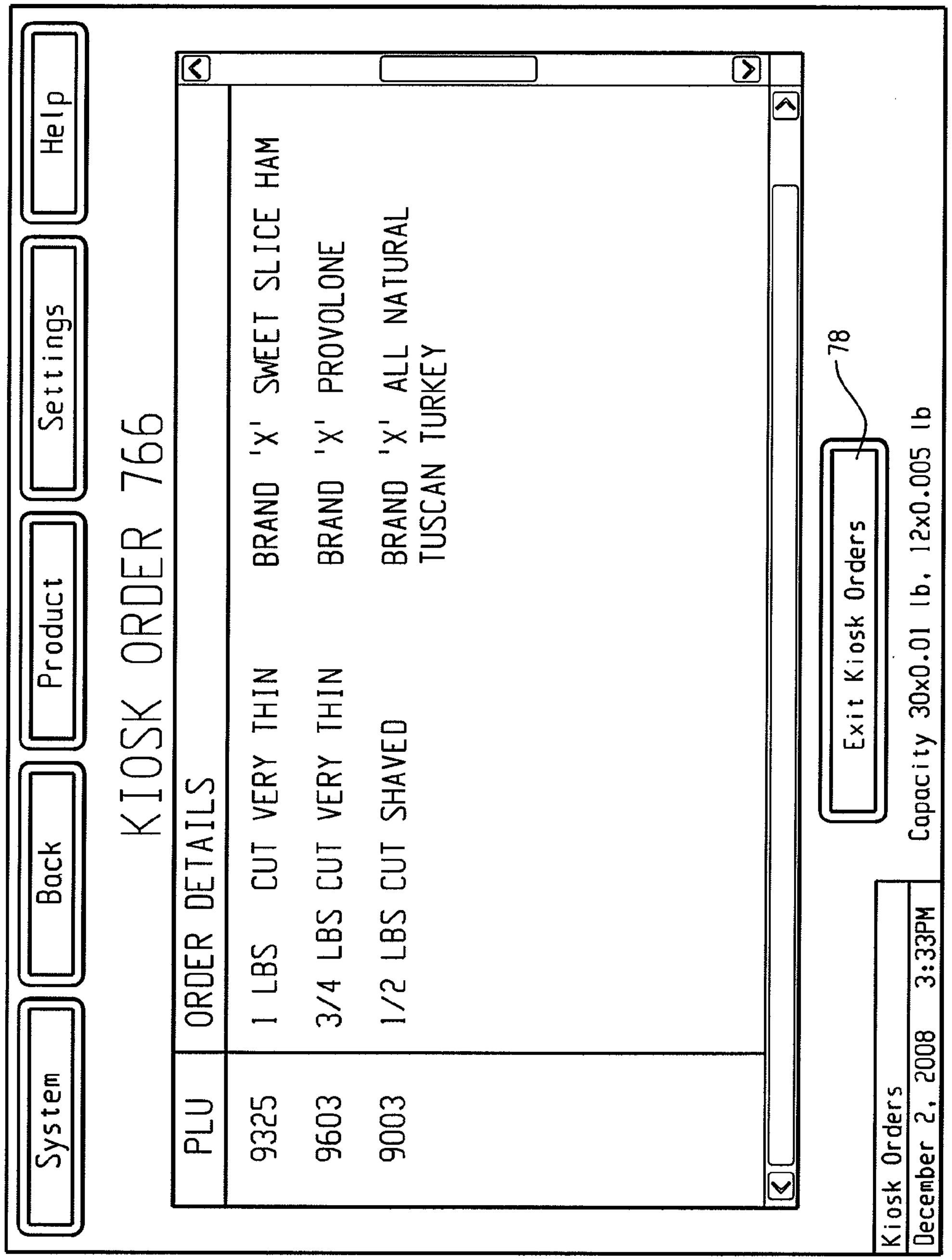
Figure 7:
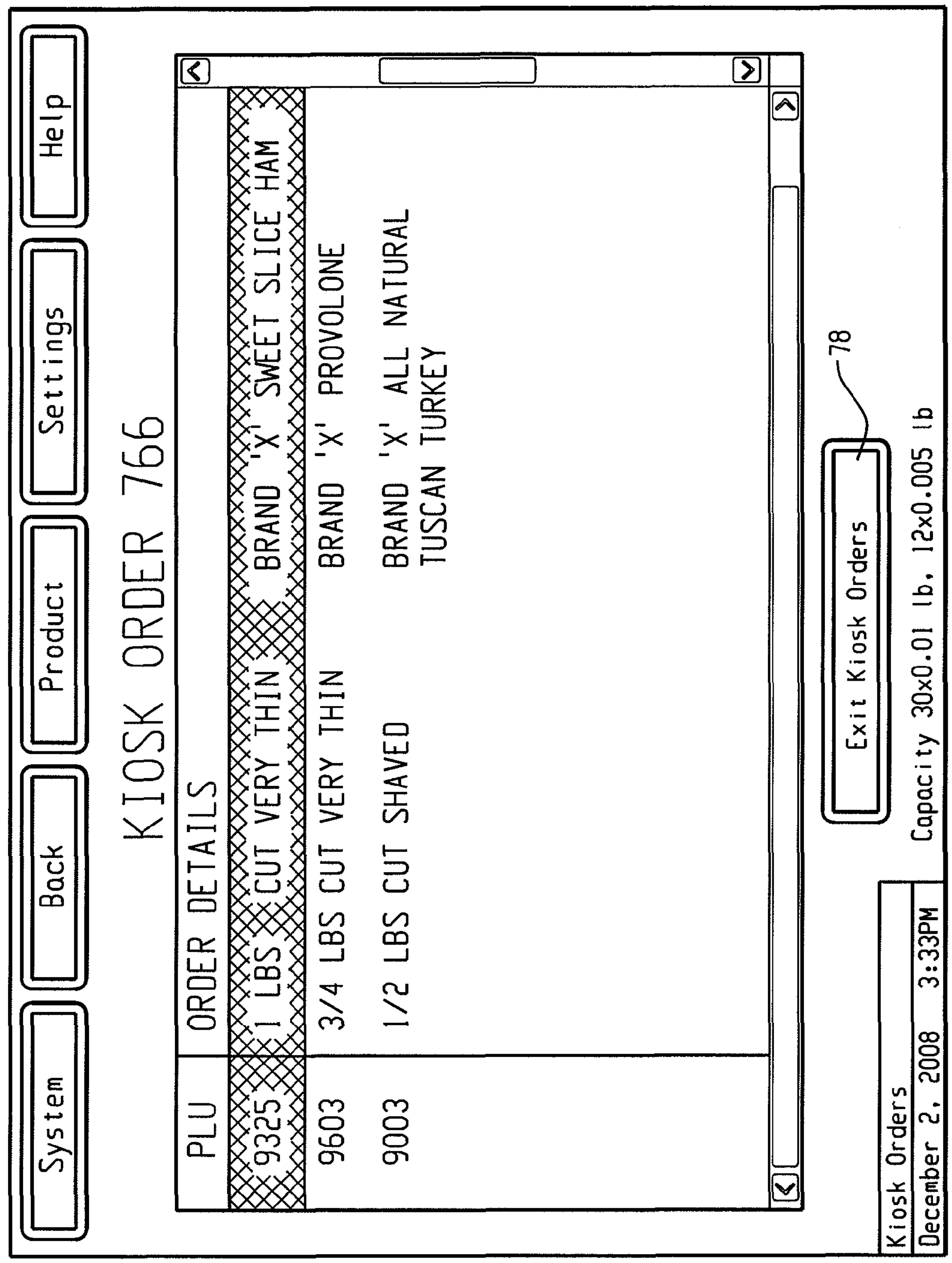
Figure 8:
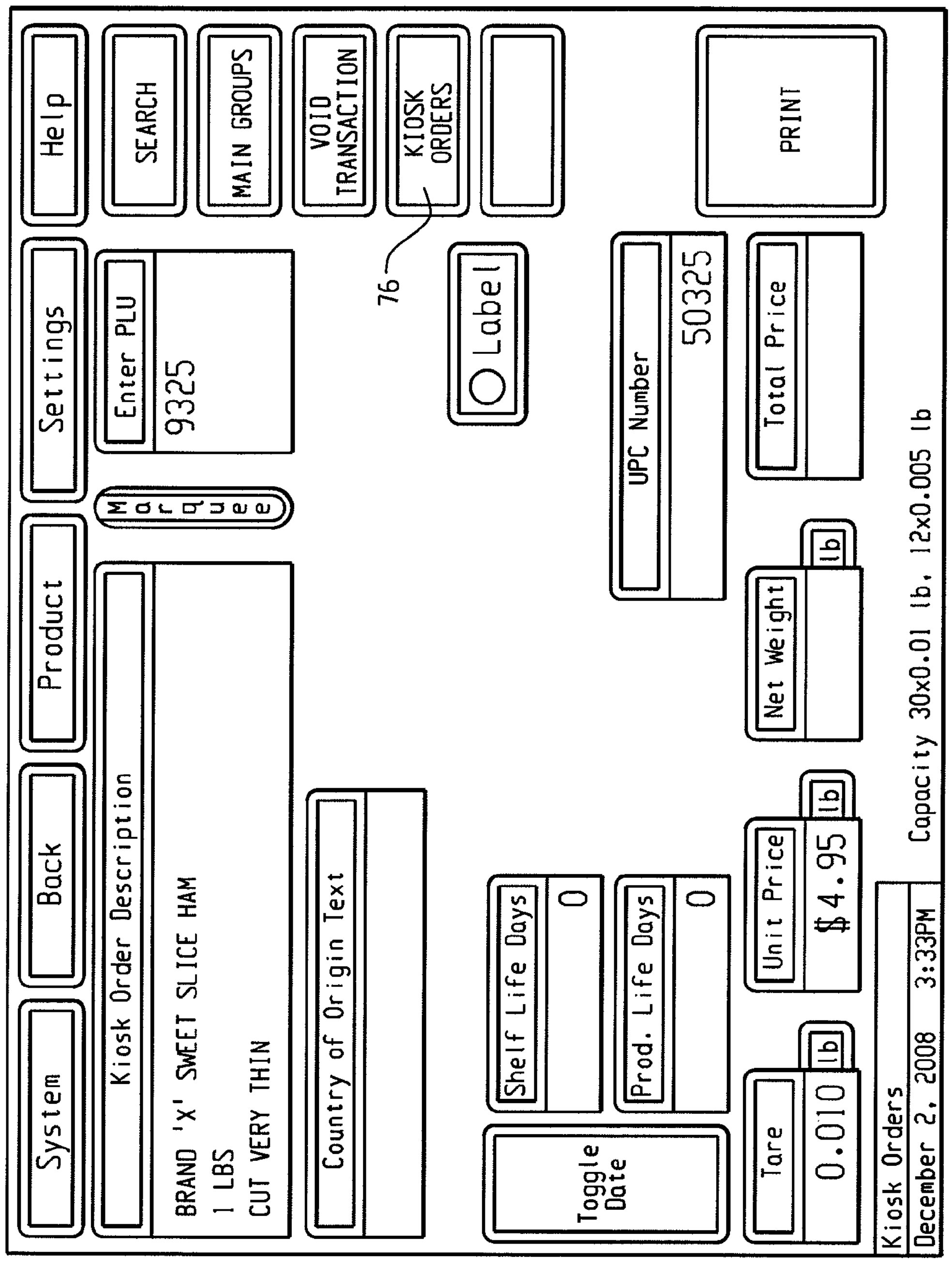
Figure 9:
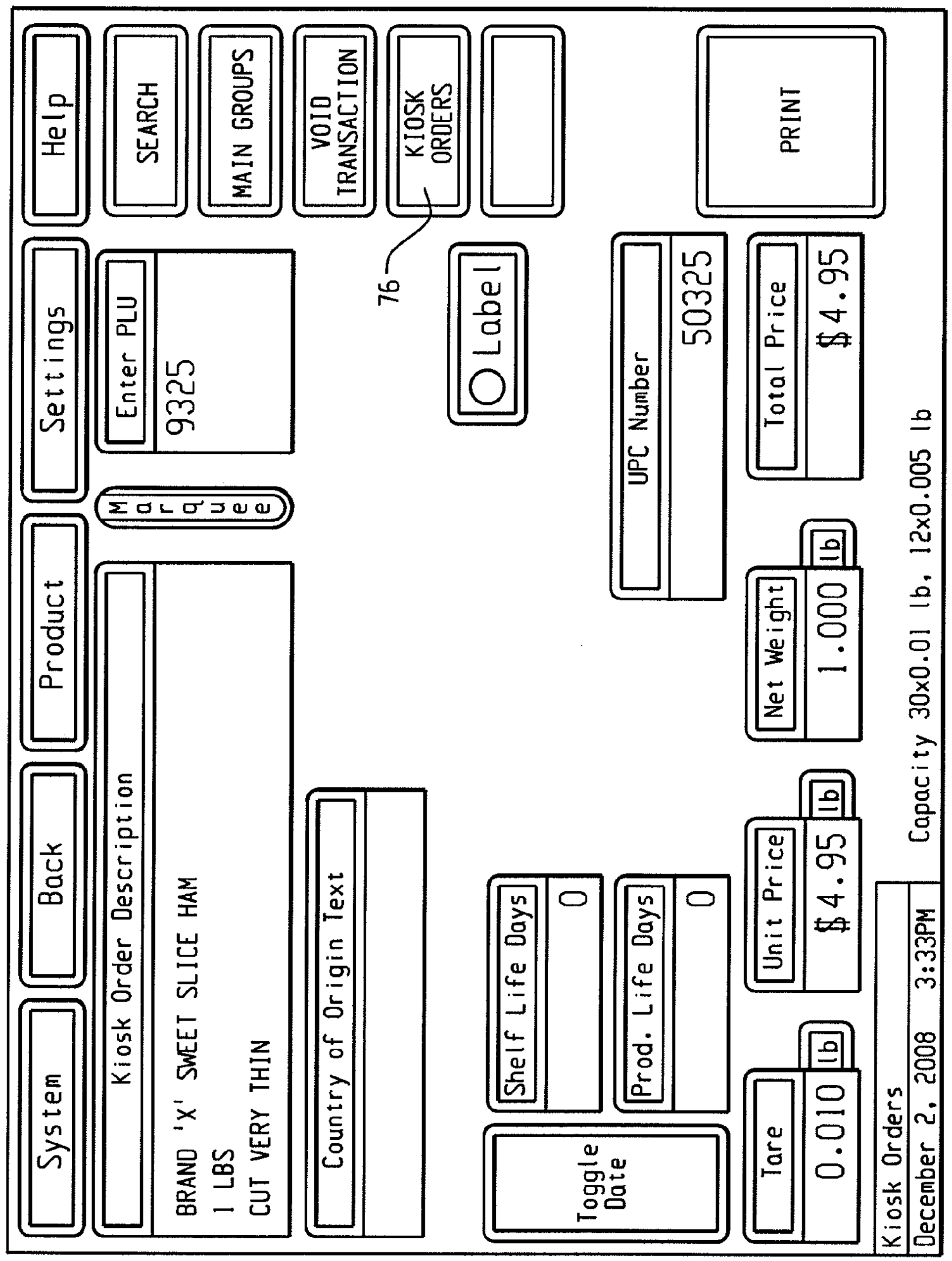
Figure 10:
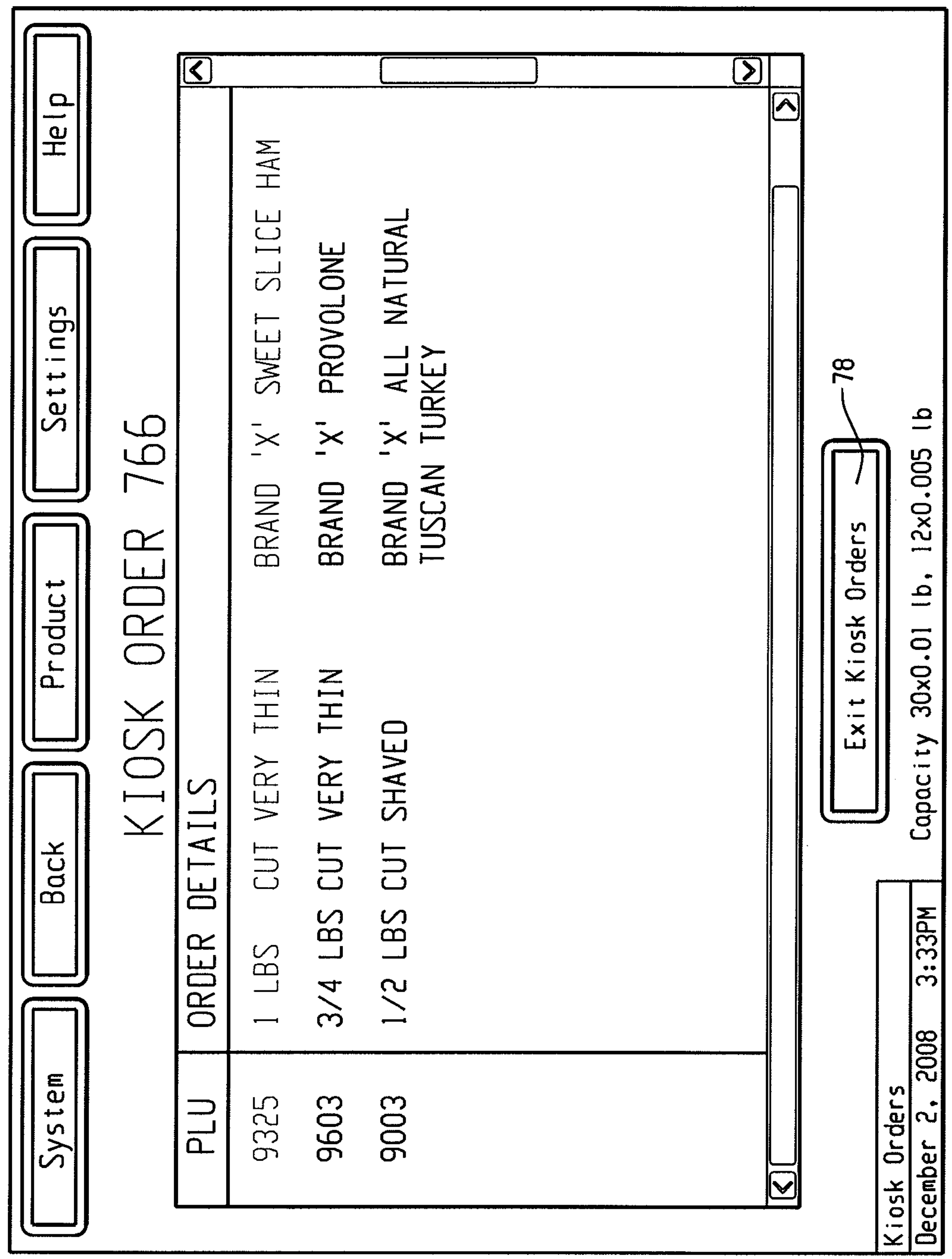

When an operator selects one of the orders, a display screen is provided showing the items in the order, per FIG. 6. The scale controller also associates the electronic order with the identification data of the operator that is logged onto the scale. The price lookup number, order quantity/weight, cut thickness and product name are shown. The operator selects the item that he/she is going to process from the order, as reflected by the highlighting in FIG. 7 of the first item, and a next interface screen is produced that provides further details on the item to be processed, per the pricing display screen FIG. 8. The operator weighs the item, which is priced per FIG. 9, and then presses the PRINT button to produce the label to be applied to the item. Once the label has been printed, the scale controller treats that item from the order as having been fully processed, and returns the interface screen to the order item detail display screen, where the processed item is shown in an alternative display format (e.g., the lighter shade illustrated in FIG. 10). The scale controller also prevents further selection of such items that have already been processed.

Figure 11:
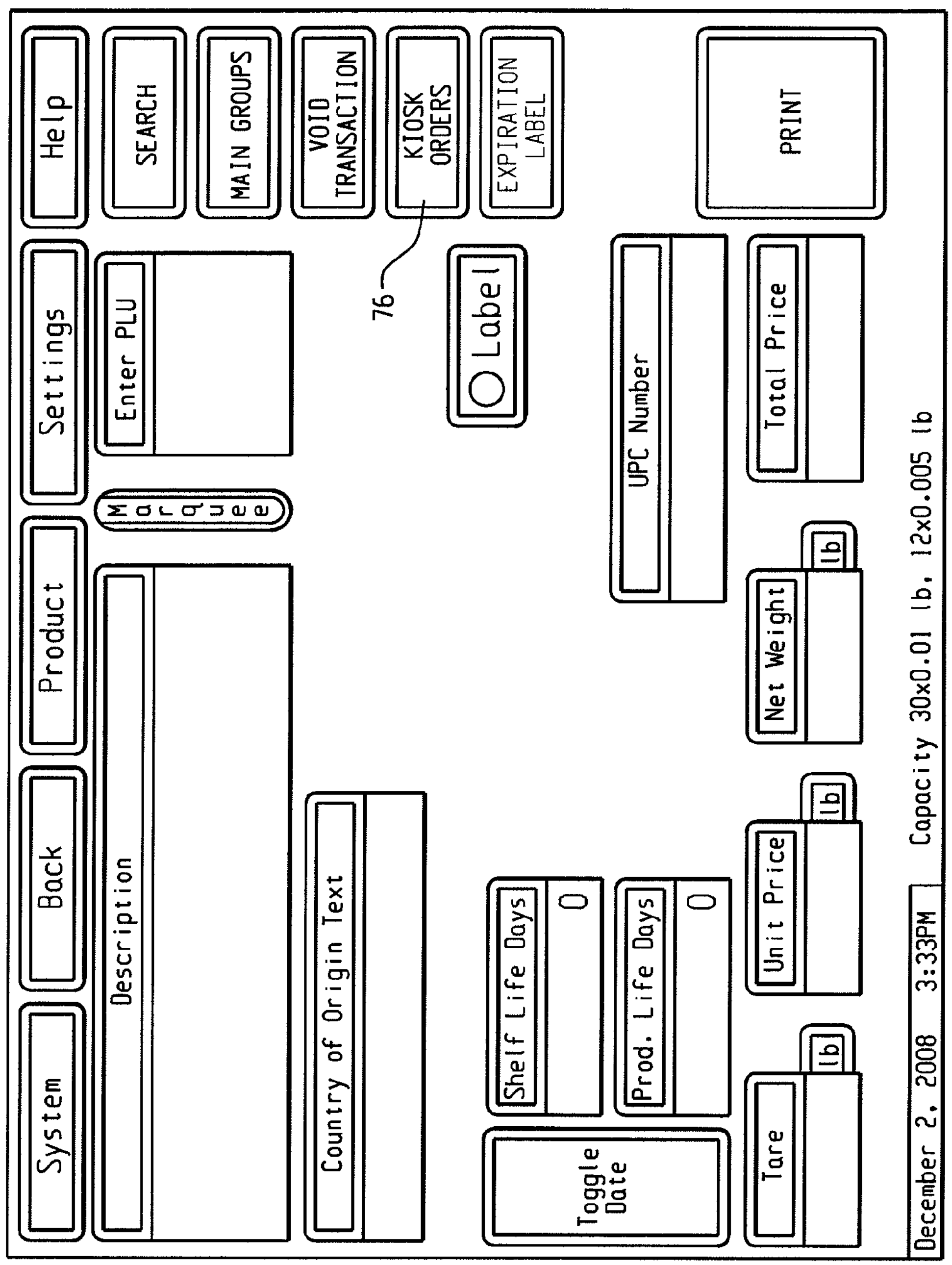

Depending upon the level of in-person demand for operator/deli personnel services, the operator may be able to fully process a given order without interruption by sequentially selecting and processing each item of the order. On the other hand, it may be necessary for the operator to temporarily stop processing an order for the purpose of dealing with a customer making an in-person order in the perishables department. In this case, the operator simply selects the Exit Kiosk Orders button 76, in which case the scale controller causes a standard, product weighing interface screen to be presented, allowing the customer to manually enter the PLU of whatever item needs to be weighed and priced for the in-person customer, per the exemplary screen of FIG. 11. When the operator is ready to return to processing the KIOSK order, he/she simply selects the KIOSK Orders button 78, and the scale controller automatically calls up the order item detail display screen (FIG. 10) so that the operator can continue processing the order that was not completed.

Figure 12:
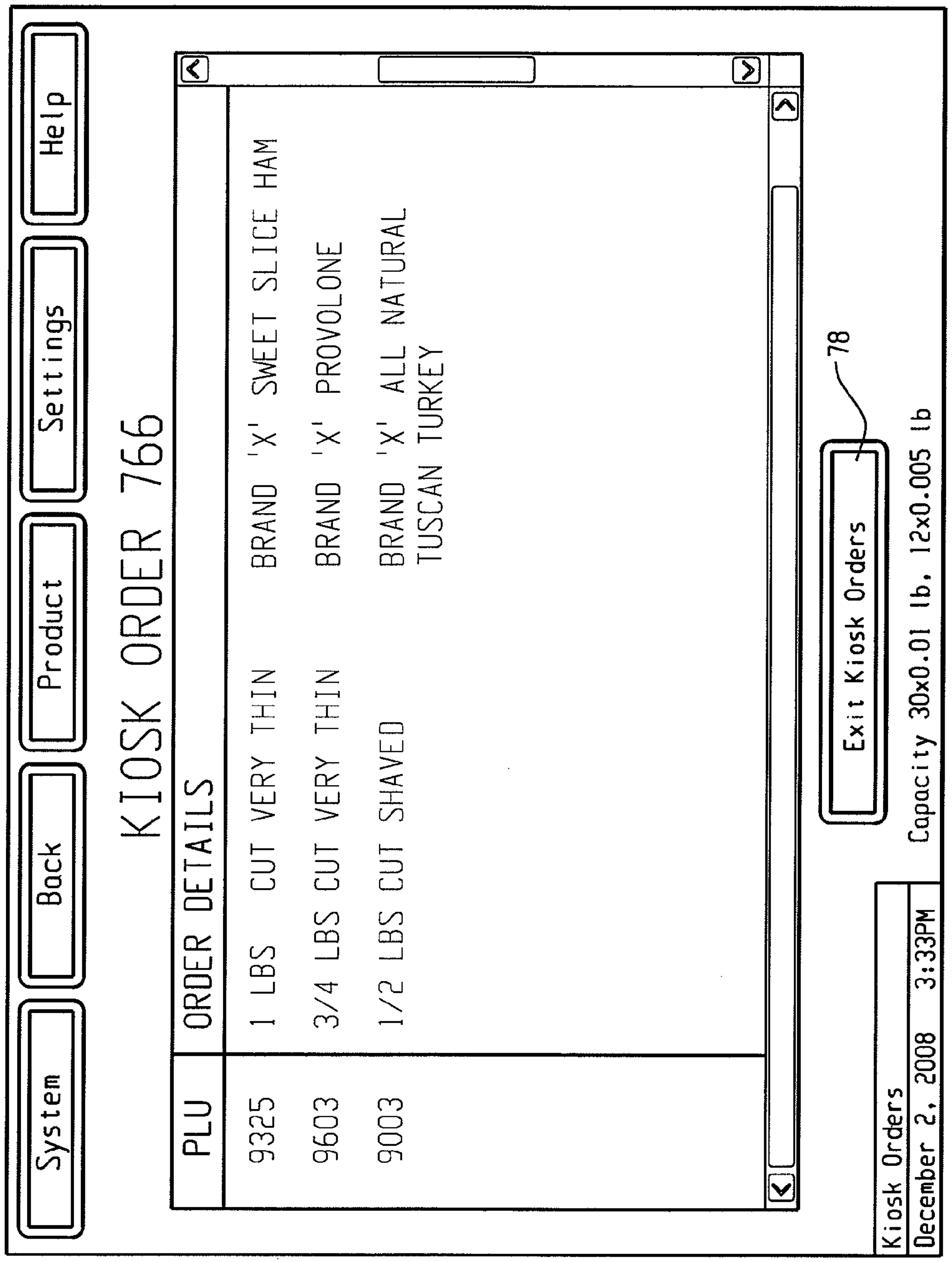
Figure 13:
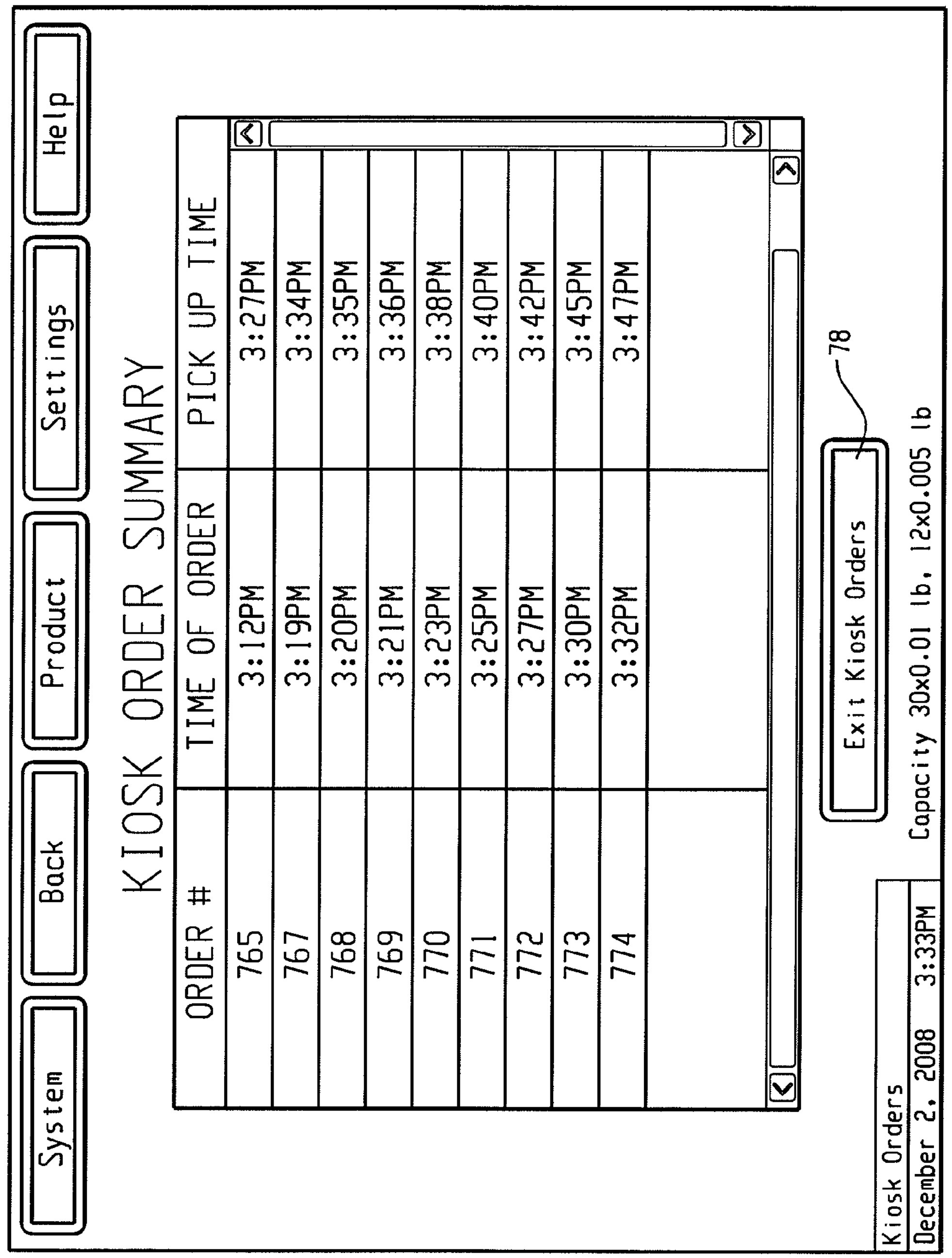

Once all items for a given order have been processed, all items in the order are shown in the alternative display format, per FIG. 12, so that the operator knows the order is complete. The scale controller will then automatically effects printing of an order summary label that can be placed on the package containing all of the items in the order. The scale controller then provides or returns to an updated KIOSK Order Summary interface display, per FIG. 13, where the order that was just completed is no longer displayed, and allowing the operator to select another order from among those displayed.

The scale controller of each given scale also regularly (i) communicates order status information back to the store computer 60 so that the other scales can be updated and/or (ii) communicates the order status information directly to the other scales in the network and/or (iii) communicates order status information back to the kiosk or one or more other computer systems for the purpose of order tracking.

It is to be clearly understood that the above description is intended by way of illustration and example only and is not intended to be taken by way of limitation. For example, electronic orders could be submitted via computers other than the KIOSK unit, such as an online product order submission system associated with the store computer 60 or a mobile device based ordering system.

What is claimed is:

1. A scale for use in weighing food products, comprising:

a weighing station for receiving food products to be weighed, the weighing station having an associated mechanism for producing weight indicative signals;

a controller for receiving weight indicative signals from the mechanism, the controller operable to establish a price for a weighed food product based in part upon a weight indicative signal produced for that food product;

a communications interface for receiving electronic product orders;

an operator interface including an operator display, the controller connected with the operator display for control thereof;

wherein the controller is configured to receive electronic product orders and provide an operator with interface display information enabling the operator to select, view and process electronic product orders;

wherein the controller is configured to enable operator selection of an electronic order function and, upon operator selection of the electronic order function, the controller effects display of a list of electronic orders and is configured to enable operator selection of an electronic order for processing;

wherein, upon operator selection of the electronic order for processing, the scale controller associates the electronic order with identification data of the operator that is logged onto the scale.

2. The scale of claim 1 wherein, the controller is configured to effect display of in-process electronic orders that have been associated with identification data for an operator that is different than the operator that is logged into the scale but prevents selection of such in-process electronic orders by the operator that is logged into the scale.

3. A scale for use in weighing food products, comprising:

a weighing station for receiving food products to be weighed, the weighing station having an associated mechanism for producing weight indicative signals;

a controller for receiving weight indicative signals from the mechanism, the controller operable to establish a price for a weighed food product based in part upon a weight indicative signal produced for that food product;

a communications interface for receiving electronic product orders;

an operator interface including an operator display, the controller connected with the operator display for control thereof;

wherein the controller is configured to receive electronic product orders and provide an operator with interface display information enabling the operator to select, view and process electronic product orders;

wherein the controller is configured to enable operator selection of an electronic order function and, upon operator selection of the electronic order function, the controller effects display of a list of electronic orders and is configured to enable operator selection of an electronic order for processing;

wherein the controller is configured such that, upon operator selection of the electronic order for processing, the scale presents a display of items contained in the selected electronic order and is configured to enable operator selection of each item for processing.

4. The scale of claim 3 wherein the controller is configured such that, upon operator selection of the item for processing, the scale presents a display of an item weigh interface that includes item name, order amount, cut thickness, item number and item price.

5. The scale of claim 4 wherein the controller is configured such that, during display of the presented item weigh interface if a label print operation is triggered, the scale again presents a display of items contained in the electronic order with the item that was previously selected for processing disabled from further operator selection.

6. The scale of claim 3 wherein the controller is configured (i) to enable operator exit of the selected electronic order prior to completion of processing of the selected electronic order and (v) upon subsequent operator selection of the electronic order function, to effect display of unfilled items from the selected electronic order.

7. The scale system of claim 3 wherein the controller is configured such that upon operator processing of all items in the selected electronic order, the controller automatically effects printing of an order summary label for placement on a package containing the items in the selected order.

8. A food item order and fulfillment system in a store, the system including:

the scale of claim 1 located in a perishables food department of the store;

an electronic ordering kiosk located in the store, the kiosk configured to enable customers to identify multiple food items and related quantities as a single electronic product order, the electronic ordering kiosk operatively connected to communicate electronic product orders to the scale.

9. A method for filling food item orders in a store, the method comprising the steps of utilizing a scale including a weighing station, a controller pricing food items based upon weight, a communications interface for receiving electronic product orders, and an operator interface including an operator display;

receiving electronic product orders at the scale via the communications interface;

enabling operator selection of an electronic order function of the scale;

upon operator selection of the electronic order function, displaying a list of electronic orders;

enabling operator selection of an electronic order for processing; and upon operator selection of an electronic order for processing, the operator display displaying multiple items contained within the selected electronic order.

10. The method of claim 9 wherein, upon operator selection of the electronic order for processing, the scale controller associates the selected electronic order with identification data of the operator that is logged onto the scale.

11. The method of claim 10 wherein, during display of the list of electronic orders, the scale displays in-process electronic orders that have been associated with identification data for an operator that is different than the operator that is logged into the scale but prevents selection of such in-process electronic orders by the operator that is logged into the scale.

12. The method of claim 9, including:

enabling operator selection of an item from the selected order for processing; and upon operator selection of the item for processing, the scale presents a display of an item weigh interface that includes item name, order amount, cut thickness, item number and item price.

13. The method of claim 12, including:

during display of the presented item weigh interface if a label print operation is triggered, the scale again presents a display of items contained in the selected electronic order with the item that was previously selected for processing disabled from further operator selection.

14. The method of claim 9, including:

enabling operator exit of the selected order prior to completion of processing of the selected order;

upon subsequent operator selection of the electronic order function, the operator display displays unfilled items from the selected order that was not completed.

15. The method of claim 9, including:

upon operator processing of all items in the selected order, the scale automatically prints an order summary label for placement on a package containing the items in the selected order.

* * * * *